May 3, 1960
W. STELZER
2,935,167
EMERGENCY VACUUM SYSTEM
Filed Oct. 22, 1956
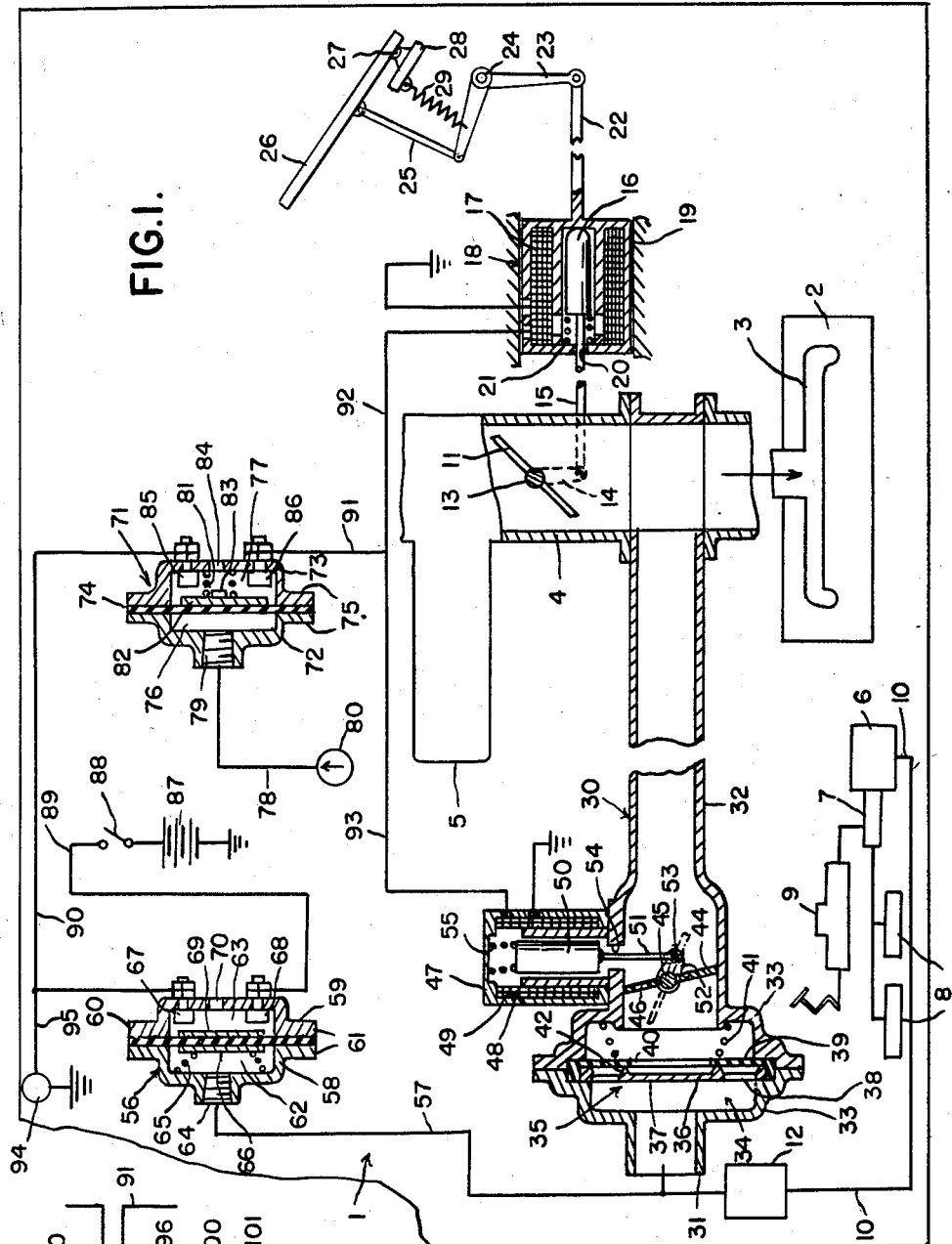
INVENTOR.
WILLIAM STELZER
BY
Whittemore, Hulbert & Belknap
ATTORNEYS

2,935,167

EMERGENCY VACUUM SYSTEM

William Stelzer, Bloomfield Hills, Mich., assignor to Kelsey-Hayes Company, a corporation of Delaware Application October 22, 1956, Serial No. 617,378

17 Claims. (Cl. 192—3)

This invention relates to the utilization of an internal combustion engine serving as a prime mover for a motor vehicle to create sub-atmospheric pressure in a power braking system associated with the motor vehicle.

The invention has for some of its objects to provide an improved control device for temporarily utilizing the engine to draw air from the braking system when the sub-atmospheric pressure in the power braking system has become reduced to a predetermnied limit such that any further increase in pressure would be undesirable in that it could render the power braking system unsafe or possibly inoperative to effectively apply the brake means of the system, and to thus utilize the engine when it is running above a predetermined speed and more particularly a relatively high speed.

The invention has for other objects to provide an improved control device which is automatic in operation and controls the operation of the engine to function as a prime mover or as a vacuum pump; to provide a control device which utilizes the engine in a manner such that the operation of the engine is practically undisturbed; to provide a control device which is operable to close off the regular air to the engine for an instant or brief interval and during this instant to connect the engine to the braking system; and to so construct and proportion the control device and the braking system with respect to the engine that the volume of air withdrawn by the engine is small relative to the available or usable pumping capacity of the engine so that the engine operates as a vacuum pump to withdraw air for only a relatively sort time, which may be a fraction of a second, with the result that the operation of the engine is practically undisturbed.

The invention has for a further object to provide a system for utilizing the engine of a motor vehicle as a vacuum pump to create sub-atmospheric pressure in the braking system which makes unnecessary the conventional vacuum pump usually provided on a motor vehicle for this purpose.

Other objects and features of the invention will become apparent as the description proceeds, especially when taken in conjunction with the accompanying drawing illustrating preferred embodiments of the invention, wherein:

Fig. 1 is a schematic view of the engine and power braking system of a motor vehicle including a control device for utilizing the vehicle engine to create sub-atmospheric pressure in the braking system.

Fig. 2 is a fragmentary schematic view of a modification.

As illustrated schematically in Fig. 1, the motor vehicle 1 is equipped with the internal combustion engine 2 which serves as a prime mover for the motor vehicle. The motor vehicle also has associated with it a power braking system which employs sub-atmospheric pressure in securing differential pressure to apply the brake means. The internal combustion engine 2 is conventional and equipped with air intake means which comprises the intake manifold 3, the air intake line 4 with which latter the carburetor 5 is asssociated.

The power braking system of the motor vehicle is conventional and has the booster 6 provided with the hydraulic cylinder 7, the wheel cylinders 8 for applying the brakes and the manually operable master cylinder 9. The wheel cylinders are hydraulically connected to the hydraulic cylinder and the master cylinder is hydraulically connected to the booster and controls its operation. The booster is of the vacuum suspended type and is connected by the vacuum line 10 to the air intake means of the engine below the conventional manually operable throttle 11. A reservoir or vacuum tank 12 is in vacuum line 10. The throttle valve 11 is disposed within the air intake line 4 and is supported on a pivot pin 13 for swinging movement from the intermediate position shown clockwise to close or shut off the flow of regular air to the engine through the intake line and counterclockwise to substantially fully open the intake line. The throttle valve 11 is rigidly mounted on pin 13, and a lever 14 has one end rigidly secured to pin 13 outside of the intake line 4, the other end of the lever being pivoted to a link 15. The other end of the link 15 has a solenoid core 16 thereon reciprocable within the winding 17 of the solenoid 18 supported in reciprocable housing 19. The housing has an opening 20 for freely receiving the link 15, and a compression coil spring 21 has one end abutting the core 16 and the other end compressed against the inner surface of the housing 19 urging the core to the right relative to the housing or to the position shown in the drawing. The housing 19 has an extension or rod 22 from one end thereof, the free end of the rod being pivoted to one arm of a bell crank 23 in turn pivoted upon a fixed pin 24. The other arm of the bell crank is pivoted to one end of a link 25, the other end of the link being pivoted to the accelerator pedal 26 which is pivotally mounted at 27 upon the floorboard 28 of the motor vehicle. A tension spring 29 extends between the floorboard and one arm of the bell crank normally urging the bell crank in a clockwise direction to a position in which the throttle valve fully closes the intake line 4.

The vacuum line 10 has a section 30 of large diameter relative to the rest of the line which communicates with and extends from the intake line 4 below the throttle 11 and leads to the reservoir 12. The section 30 has the parts 31 and 32 formed with enlarged adjacent ends 33 which are secured together to form a check valve chamber 34. A check valve 35 is provided in the chamber 34 and comprises a disk 36 secured between the adjacent ends 33 and extending across the chamber. The disk 36 has an imperforate central pcrtion 37 and an annular portion 38 surrounding the central portion which is apertured at circumferentially spaced points for the passage of air. The valve member 39 extends across chamber 34 and is secured between the enlarged ends 33 and is in the form of a circular disk of rubber or like material having an enlarged central opening 40 of somewhat smaller diameter than the diameter of the central portion 37 of disk 36. A compression coil spring 41 compressed between the valve member 39 and the adjacent enlarged end 33 of part 32 normally urges the valve member to seat against the circular ridge-like seat 42 around the periphery of the central portion 37 of disk 36. The check valve 35 permits the flow of air past the check valve in one direction only, that is in a direction toward the air intake line to the engine. The check valve 35 prevents air from bleeding into the vacuum brake system from the air intake to the engine as might occur when the pressure of the regular air to the engine increases above the air pressure in the vacuum brake system. This would occur, for example, when the throttle valve 11 is wide open. Thus the vacuum in the brake system could not be maintained without the check valve.

A valve plate 44 is located in the section 30 of the vacuum line between the air intake line 4 and the check valve 35. The valve plate 44 is pivoted on a pin 45 secured to and extending across section 30 for swinging movement of the valve plate from the fully closed position illustrated in solid lines to an open position shown in dotted lines. The valve plate has a restricted passage 46 so that even in the closed position of the valve plate shown in full lines, a restricted flow of air across the valve plate is permitted.

A housing 47 is mounted upon the part 32 of section 30 and houses a solenoid 48, the winding of which is indicated at 49. The solenoid core 50 is reciprocable vertically within the winding 49, and a rod 51 is pivoted to and depends from the lower end of the core and is pivoted to a bracket 52 by a pin 53 to open and close the valve plate 44 upon upward and downward movement of the core 50 within the solenoid winding. The enlarged section 30 of the vacuum line has an opening 54 for clearing the rod 51, and the housing 47 overlying the opening 54 provides a seal to maintain the vacuum within the section 30. Bracket 52 is secured to valve plate 44.

A coil spring 55 is located within housing 47 and has its upper end compressed against the upper end of the housing and its lower end compressed against the solenoid core 50 normally urging the latter downwardly to close the valve plate 44.

A low vacuum switch 56 is provided in an extension 57 of the vacuum line 10. The switch 56 comprises a pair of housing sections 58 and 59 having a flexible diaphragm 60 of rubber or similar material sandwiched therebetween and secured to and between the annular flanges 61 of the sections 58 and 59. The diaphragm 60 separates the interior of the switch into two chambers 62 and 63, the chamber 62 communicating with the vacuum line through the port 64. A compression coil spring 65 located within chamber 62 is compressed between the wall of the chamber and the bearing plate 66 secured to the diaphragm, urging the latter to the right. A pair of electrical contacts 67 and 68 are mounted upon switch section 59 and project into the chamber 63 for engagement by the contact plate 69 of electrically conductive material secured to the diaphragm 60. A port 70 in section 59 opens chamber 63 to atmosphere.

A low engine speed cut-out switch 71 is provided composed of a pair of housing sections 72 and 73 and a diaphragm 74 of any suitable flexible material such as rubber is sandwiched between the sections and secured to and between the annular flanges 75 of the sections. The diaphragm 74 separates the interior of the switch into chambers 76 and 77, the chamber 76 being in communication with water line 78 through port 79. The line 78 is in the water cooling system of the engine 2. A water pump 80, of conventional construction, is driven by the engine 2 and the pressure of the water in line 78 is dependent upon the speed of the water pump 80 and hence the speed of the engine. A compression coil spring 81 is located within chamber 77 having one end compressed against the wall of the chamber and the other end compressed against a contact plate 82 of suitable electrically conductive material secured to the diaphragm. The plate has a pilot 83 secured thereto and extending within the coil spring 81.

The port 84 opens chamber 77 to atmosphere, and a pair of electrical contacts 85 and 86 are mounted on the switch section 73 and extend into chamber 77 for engagement with the plate 82 carried by the diaphragm.

The storage battery of the motor vehicle is indicated at 87 and the ignition switch at 88. The electrical lead 89 extends from the ignition switch to contact 68 of the low vacuum switch, and the lead 90 extends from contact 67 of the low vacuum switch to contact 85 of the low engine speed cut-out switch. Lead 91 extends from contact 86 to leads 92 and 93 which respectively are connected to the coils of solenoids 18 and 48. A warning signal 94, which may be in the form of a light or buzzer, is connected into the circuit by a lead 95.

In operation, assuming that a sufficient vacuum is present in the power braking system, the atmospheric pressure in chamber 63 of the low vacuum switch will be sufficient to overcome the sub-atmospheric pressure in chamber 62, which is equal to the vacuum in the power braking system, plus the strength of spring 65 to maintain the diaphragm 60 in a position in which the contact plate 69 is out of engagement with the electrical contacts 67 and 68. Hence the circuit from the storage battery 87 to the solenoids 18 and 48 is open. The spring 55 will thus hold the valve plate 44 in the closed position shown in solid lines, and the spring 21 will hold the solenoid core 16 to the right as illustrated. Hence operation of the throttle valve 11 by the accelerator pedal 26 will take place in the usual manner with the core 16 moving as a unit with the housing 19 for the solenoid winding.

In the event that the vacuum in the power braking system drops to a point such that any further increase in pressure would be undesirable in that it would render the power braking system unsafe or possibly inoperative, the sub-atmospheric pressure in chamber 62 of the low vacuum switch, which is equal to the sub-atmospheric pressure in the braking system, plus the strength of spring 65 is sufficient to shift the diaphragm 60 to the right against the atmospheric pressure in chamber 63 producing engagement between the contact plate 69 and the electrical contacts 67 and 68. Assuming that the engine is running above a predetermined speed and more particularly at a relatively high speed, the pressure in chamber 76 of the low engine speed cut-out switch, which is equal to the water pressure in the water system of the engine, will be great enough to overcome the atmospheric pressure in chamber 77 plus the strength of spring 81 to shift the diaphragm 74 to the right causing engagement of the contact plate 82 with the electrical contacts 85 and 86. Thus when the engine is running above the predetermined speed and when the vacuum in the braking system drops to a predetermined point, the circuit from the storage battery of the engine to the solenoids 18 and 48 is completed energizing the solenoids to raise the core 50 and shift core 16 to the left relative to housing 19. As a result, the valve 44 is moved to its open position, shown in dotted lines, and the throttle valve 11 is closed to shut off the regular air to the engine. It will be noted that the throttle valve is closed without disturbing the accelerator pedal 26 and despite the fact that the pedal 26 may be held in any position by the operator. The warning signal 94 will also be energized to tell the operator that an emergency exists.

With the throttle valve 11 closed and the valve plate 44 open, the flow of regular air to the engine is shut off and the engine acts as a vacuum pump to draw air from the braking system. The section 30 of the vacuum line 10 is of relatively large diameter as compared with the rest of the line so that air can be drawn from the braking system rapidly and without restriction and as a result the sub-atmospheric pressure in the braking system can be reduced to the desired level in a very short period of time, possibly only a fraction of a second, so that the operation of the engine is not disturbed. Moreover, the control devices and braking system are so constructed with respect to the engine that the volume of air withdrawn by the engine is small relative to the available or usable pumping capacity of the engine so that the engine operates as a vacuum pump to withdraw air for only a relatively short time. The reservoir or vacuum tank 12 is placed close to the air intake line of the engine to reduce the time required for evacuating it. Unless the engine is running above a predetermined speed, the circuit to the solenoids 18 and 48 will be opened at the low engine speed cut-out switch 71 so that at low engine speeds the automatic control is inoperative and hence will not upset the operation of the engine.

In case the engine slows down enough to open the low engine speed cut-out switch 71 before a sufficient vacuum has been produced in the reservoir 12, the solenoids 18 and 48 are deenergized to permit the engine to return to normal operation, whereupon the cut-out switch 71 will again close to energize the solenoids and enable the engine to withdraw additional air from the braking system.

The restricted passage 46 in the valve plate 44 enables the engine at all times to draw air in small quantities from the vacuum line 10 when manifold pressure drops sufficiently below the sub-atmospheric pressure in the braking system to open chack valve 35. However the passage 46 is of relatively small size so that the volume of air withdrawn by the engine is correspondingly small and thus will not disturb the normal operation of the engine. Therefore, under normal conditions the emergency system will not be employed. However, in an emergency situation, when the vacuum in the braking system drops below a safe minimum, the throttle valve 11 is closed and valve plate 44 opened momentarily so that air can be withdrawn rapidly and without restriction from the braking system. The operation of the emergency system is of very short duration so that the operation of the engine is not disturbed. Because the available or usable pumping capacity of the engine is so large relative to the volume of air withdrawn from the braking system, the operation of the emergency system may take only a fraction of a second. Thus even under heavy engine load the normal operation of the engine is practically undisturbed.

Figure 2 illustrates a system having a modified low engine speed cut-out switch 96. Switch 96 has contacts 97 and 98 respectively connected to leads 90 and 91, and a contact plate 99, of suitable electrically conductive material, is carried by an arm of bell-crank 100. A spring 101 urges the bell crank clockwise to the open position of the switch illustrated. A blade 102 carried by the other arm of the bell crank is located in the slip stream of the engine fan 103 which is, of course, driven by the engine 2. When the engine attains sufficient speed so that the engine may be utilized to withdraw air from the braking system without disturbing the operation of the engine, the air pressure from the slip stream of the fan acting on blade 102 is sufficient to swing the bell crank counterclockwise against the action of spring 101 to move plate 99 into engagement with contacts 97 and 98 and thereby close the switch.

What I claim as my invention is:

1. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for said first passage to regulate the flow through said first passage to the engine, a second passage connecting the vacuum power system to said first passage downstream from said manually operable valve, a valve for said second passage normally closed, a check valve in said second passage preventing flow of fluid from said first passage to the vacuum power system, and first and second means for simultaneously closing said manually operable valve and opening said second-mentioned valve respectively for operation of the engine as a vacuum pump to withdraw air from the vacuum power system, said first and second means being operative in response to predetermined sub-atmospheric pressure in the vacuum power system and engine speed.

2. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for said first passage to regulate the flow through said first passage to the engine, a second passage connecting the vacuum power system to said first passage downstream from said manually operable valve, a valve for said second passage normally closed, a check valve in said second passage preventing flow of fluid from said first passage to the vacuum power system, and first and second means for simultaneously closing said manually operable valve and opening said second-mentioned valve respectively for operation of the engine as a vacuum pump to withdraw air from the vacuum power system, said first and second means being operative in response to predetermined sub-atmospheric pressure in the vacuum power system and engine speed, said second-mentioned valve having a restricted passage therethrough permitting a restricted flow of fluid across said second-mentioned valve at all times.

3. A control device for utilizing an internal combustion engine, serving as a prime mover for a motor vehicle, to create sub-atmospheric pressure in a vacuum power system associated with the motor vehicle braking system comprising a first passage from the atmosphere to the engine, manually operable valve means for said first passage to regulate the flow through said first passage to the engine, a second passage connecting the vacuum power system to said first passage downstream from said valve means, valve means for said second passage normally at least partially closed, and third and fourth means for simultaneously closing said first-mentioned valve means and opening said second-mentioned valve means respectively, said third and fourth means being operative in response to predetermined sub-atmospheric pressure in the vacuum power system and engine speed.

4. A control device for utilizing an internal combustion engine, serving as a prime mover for a motor vehicle, to create sub-atmospheric pressure in a vacuum power system associated with the motor vehicle braking system comprising a first passage from the atmosphere to the engine, manually operable valve means for regulating the flow through said first passage to the engine, a second passage providing communication between the engine and the vacuum power system, valve means for said second passage controlling such communication normally at least partially closed, and third and fourth means for simutlaneously closing said manually controlled valve means and opening said second-mentioned valve means respectively, said third and fourth means being operative in response to predetermined sub-atmospheric pressure in the vacuum power system and engine speed.

5. A control device for utilizing an internal combustion engine, serving as a prime mover for a motor vehicle, to create sub-atmospheric pressure in a vacuum power system associated with the motor vehicle braking system comprising a first passage from the atmosphere to the engine, manually operable valve means for regulating the flow through said first passage to the engine, a second passage providing communication between the engine and the vacuum power system, valve means for said second passage controlling such communication normally at least partially closed, third and fourth means for simultaneously closing said manually controlled valve means and opening said second-mentioned valve means respectively, and means for controlling said third and fourth means including means responsive to the sub-atmospheric pressure in the vacuum power system.

6. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for said first passage to regulate the flow through said first passage to the engine, a second passage connecting the vacuum power system to said first passage downstream from said manually operable valve, a valve for said second passage normally closed, a check valve in said second passage preventing flow of fluid from said first passage to the vacuum power system, control means for closing said manually operable valve and for opening said second-mentioned valve for operation of the engine as a vacuum pump to withdraw air from the vacuum power system, a liquid cooling system for the engine including a water pump driven by the engine, and means for actuating said control means including a pressure switch responsive to the sub-atmospheric pressure in the vacuum power system and a second pressure switch responsive to the pressure in the liquid cooling system, said second-mentioned valve having a restricted passage therethrough permitting a restricted flow of air across said second-mentioned valve at all times.

7. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for said first passage to regulate the flow through said first passage to the engine, a second passage connecting the vacuum power system to said first passage downstream from said manually operable valve, a valve for said second passage normally closed, a check valve in said second passage preventing flow of fluid from said first passage to the vacuum power system, control means for closing said manually operable valve and for opening said second-mentioned valve for operation of the engine as a vacuum pump to withdraw air from the vacuum power system, a fan for cooling the engine driven by the latter, and means for actuating said control means including a pressure switch responsive to the sub-atmospheric pressure in the vacuum power system and a second pressure switch responsive to the pressure of air generated by said fan, said second-mentioned valve having a restricted passage therethrough permitting a restricted flow of air across said second-mentioned valve at all times.

8. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for said first passage to regulate the flow through said first passage to the engine, a second passage connecting the vacuum power system to said first passage downstream from said manually operable valve, a valve for said second passage normally closed, a check valve in said second passage preventing flow of fluid from said first passage to the vacuum power system, control means for closing said manually operable valve and for opening said second-mentioned valve for operation of the engine as a vacuum pump to withdraw air from the vacuum power system, and means for actuating said control means including a pressure switch responsive to the sub-atmospheric pressure in the vacuum power system and a second switch responsive to engine speed, said second-mentioned valve having a restricted passage therethrough permitting a restricted flow of air across said second-mentioned valve at all times.

9. A control device for utilizing an internal combustion engine, serving as a prime mover for a motor vehicle, to create sub-atmospheric pressure in a vacuum power system associated with the motor vehicle braking system comprising a first passage from the atmosphere to the engine, a first valve for said first passage, a second passage connecting the vacuum power system to said first passage downstream from said first valve, a second valve for said second passage normally closed, a check valve in said second passage preventing flow of fluid from said first passage to the vacuum power system, said second valve having a restricted passage therethrough permitting a restricted flow of air across said second valve at all times, means for closing said first valve and opening said second valve for operation of the engine as a vacuum pump to reduce the pressure in the vacuum power system, and means for controlling said first-mentioned means including means responsive to the sub-atmospheric pressure in the vacuum power system.

10. A control device for utilizing an internal combustion engine, serving as a prime mover for a motor vehicle, to create sub-atmospheric pressure in a vacuum power system associated with the motor vehicle braking system comprising a first passage from the atmosphere to the engine, a first valve for said first passage, a second passage connecting the vacuum power system to said first passage downstream from said first valve, a second valve for said second passage normally closed, a check valve in said second passage preventing flow of fluid from said first passage to the vacuum power system, said second valve having a restricted passage therethrough permitting a restricted flow of air across said second valve at all times, control means for closing said first valve and opening said second valve for operation of the engine as a vacuum pump to withdraw air from the vacuum power system, and means for actuating said control means including a pressure switch responsive to the sub-atmospheric pressure in the vacuum power system and a second pressure switch responsive to engine speed.

11. A control device for utilizing an internal combustion engine, serving as a prime mover for a motor vehicle, to create sub-atmospheric pressure in a vacuum power system associated with the motor vehicle braking system comprising a first passage from the atmosphere to the engine, valve means for regulating the flow through said first passage to the engine, a second passage providing communication between the engine and the vacuum power system, valve means for said second passage controlling such communication normally at least partially closed, control means for closing said first-mentioned valve means and for simultaneously opening said second-mentioned valve means for operation of the engine as a vacuum pump to withdraw air from the vacuum power system, and means for actuating said control means including a pressure switch responsive to the sub-atmospheric pressure in the vacuum power system.

12. A control device for utilizing an internal combustion engine, serving as a prime mover for a motor vehicle, to create sub-atmospheric pressure in a vacuum power system associated with the motor vehicle braking comprising a passage from the atmosphere to the engine, a manually operable valve for controlling the flow through said passage to the engine, a vacuum reservoir serving the vacuum power system, a relatively large vacuum transmitting line from said passage to said reservoir, a check valve in said line to permit the flow of fluid to said passage and to check the flow toward said reservoir, and means for closing said manually operable valve, said means being responsive to the sub-atmospheric pressure in the vacuum power system and to engine speed to thus close said manually operable valve when said engine runs above a predetermined speed and the vacuum in said vacuum power system is reduced to a predetermined minimum.

13. The construction as claimed in claim 12, including a throttling device to produce a restriction in said line when the engine speed is reduced to a predetermined value.

14. The construction as claimed in claim 12 including a throttling device to produce a restriction in said line when the vacuum in said braking system is above said predetermined minimum.

15. A control device for utilizing an internal combustion engine, serving as a prime mover for a motor vehicle, to create sub-atmospheric pressure in a vacuum power system associated with the motor vehicle braking system comprising a first passage from the atmosphere to the engine, manually operable valve means for regulating the flow through said first passage to the engine, a second passage providing communication between the engine and the vacuum power system, valve means for said second passage controlling such communication normally at least partially closed, means for opening said second-mentioned valve means, and means for controlling said third-mentioned means including means responsive to the sub-atmospheric pressure in the vacuum power system.

16. A control device for utilizing an internal combustion engine, serving as a prime mover for a motor vehicle, to create sub-atmospheric pressure in a vacuum power system associated with the motor vehicle braking system comprising a first passage from the atmosphere to the engine, a manually operable valve for controlling the flow through said first passage to the engine, a second passage providing communication between the vacuum power system and said first passage downstream from said manually operable valve, a check valve in said second passage for permitting the flow of air from said vacuum power system to said first passage and for checking the flow of air in the opposite direction, means for closing said manually operable valve when the vacuum in said vacuum power system is reduced to a predetermined minimum, and means for controlling said first-mentioned means including means responsive to the sub-atmospheric pressure in the vacuum power system.

17. A control device for utilizing an internal combustion engine, serving as a prime mover for a motor vehicle, to create sub-atmospheric pressure in a vacuum power system associated with the motor vehicle braking system comprising a first passage from the atmosphere to the engine, a valve for controlling the flow through said first passage to the engine, a second passage providing communication between the vacuum power system and said first passage downstream from said valve, valve means for said second passage controlling the flow of fluid therein, means for closing said valve when the vacuum in said vacuum power system is reduced to a predetermined minimum, and means for controlling said second-mentioned means including means responsive to the sub-atmospheric pressure in the vacuum power system.

References Cited in the file of this patent

UNITED STATES PATENTS

| | | |
|---|---|---|
| 2,018,426 | Taber | Oct. 22, 1935 |
| 2,265,524 | Fruth | Dec. 9, 1941 |
| 2,283,623 | Claytor | May 19, 1942 |
| 2,459,938 | Higgins | Jan. 25, 1949 |